(12) United States Patent
Edwards

(10) Patent No.: US 11,141,007 B2
(45) Date of Patent: Oct. 12, 2021

(54) PLANT HANGING ASSEMBLY

(71) Applicant: William Edwards, Plant City, FL (US)

(72) Inventor: William Edwards, Plant City, FL (US)

( * ) Notice: Subject to any disclaimer, the term of this patent is extended or adjusted under 35 U.S.C. 154(b) by 279 days.

(21) Appl. No.: 16/420,285

(22) Filed: May 23, 2019

(65) Prior Publication Data

US 2020/0367670 A1   Nov. 26, 2020

(51) Int. Cl.
*A47G 7/04* (2006.01)

(52) U.S. Cl.
CPC .................... *A47G 7/044* (2013.01)

(58) Field of Classification Search
CPC ................................ A47G 7/044; A01G 9/024
USPC ............................................. 47/67
See application file for complete search history.

(56) References Cited

U.S. PATENT DOCUMENTS

| | | | |
|---|---|---|---|
| 2,003,986 A | 6/1935 | Witthuhn | |
| 4,941,283 A * | 7/1990 | Armstrong | A47G 7/042 248/163.2 |
| 5,052,148 A * | 10/1991 | Sharon | A47G 7/047 47/67 |
| 5,438,797 A * | 8/1995 | Lendel | A01G 9/023 47/39 |
| 5,743,044 A * | 4/1998 | Hopkins | A47G 7/047 47/67 |
| 5,873,195 A | 2/1999 | Wortham | |
| 6,062,416 A | 5/2000 | Smillie | |
| 6,381,900 B1 | 5/2002 | Crowley | |
| 8,172,187 B2 | 5/2012 | Felknor | |
| 8,201,783 B1 * | 6/2012 | Bamburg, Jr. | A47G 7/041 248/150 |
| D791,014 S | 7/2017 | Hoffman | |
| 2004/0216376 A1 * | 11/2004 | Missry | A01G 9/02 47/66.6 |
| 2009/0293355 A1 * | 12/2009 | Clouston | A01G 9/02 47/67 |
| 2020/0205588 A1 * | 7/2020 | Benoit | A47G 7/044 |
| 2020/0367670 A1 * | 11/2020 | Edwards | A47G 7/044 |

* cited by examiner

*Primary Examiner* — Muhammad Ijaz

(57) ABSTRACT

A plant hanging assembly for rotatably suspending a plant pot from a support includes a plant pot that has a bottom wall and the bottom wall has a drain aperture extending therethrough. A shaft is extended through the drain aperture in the bottom wall of the plant pot and the shaft is suspended from a support. A plurality of members is each rotatably coupled to the shaft and each of the members is oriented perpendicular with respect to the shaft. The bottom wall of the plant pot rests on each of the members when the shaft is extended through the drain aperture. In this way the shaft suspends the plant pot from the support.

6 Claims, 5 Drawing Sheets

PLANT HANGING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to hanging devices and more particularly pertains to a new hanging device for rotatably suspending a plant pot from a support.

BRIEF SUMMARY OF THE INVENTION

An embodiment of the disclosure meets the needs presented above by generally comprising a plant pot that has a bottom wall and the bottom wall has a drain aperture extending therethrough. A shaft is extended through the drain aperture in the bottom wall of the plant pot and the shaft is suspended from a support. A plurality of members is each rotatably coupled to the shaft and each of the members is oriented perpendicular with respect to the shaft. The bottom wall of the plant pot rests on each of the members when the shaft is extended through the drain aperture. In this way the shaft suspends the plant pot from the support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
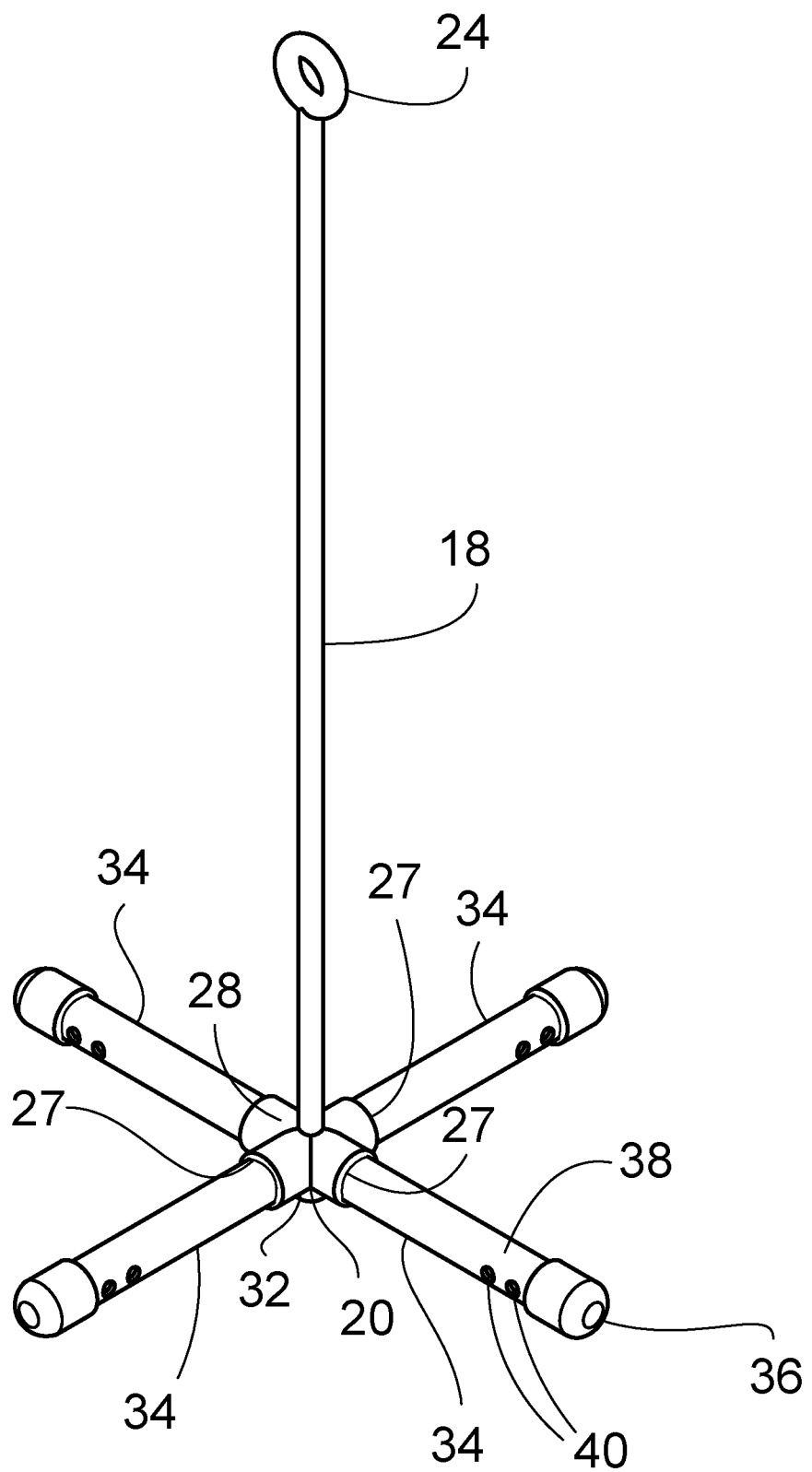
FIG. 1 is a perspective view of a plant hanging assembly according to an embodiment of the disclosure.
Figure 2:
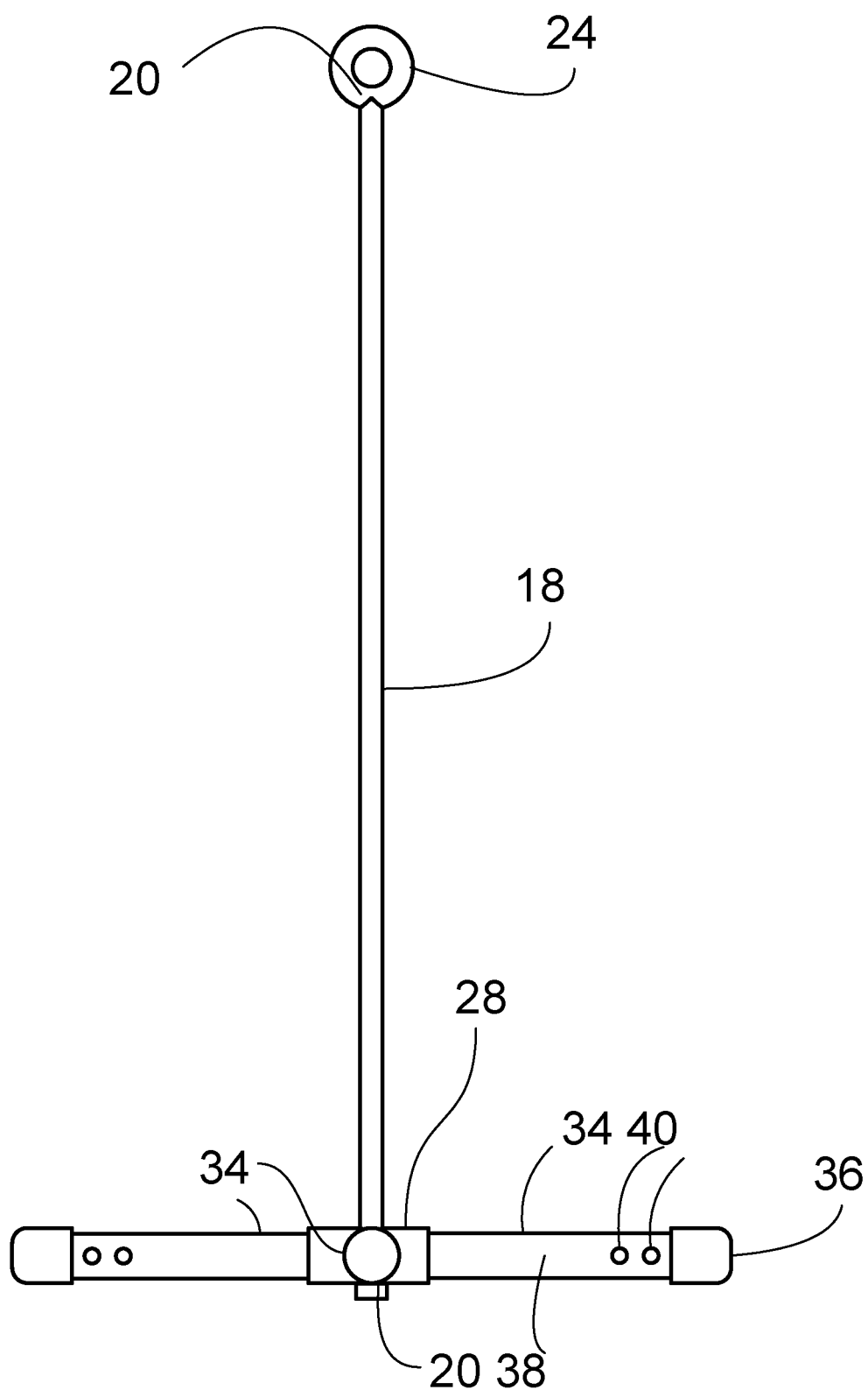
FIG. 2 is a front view of an embodiment of the disclosure.
Figure 3:
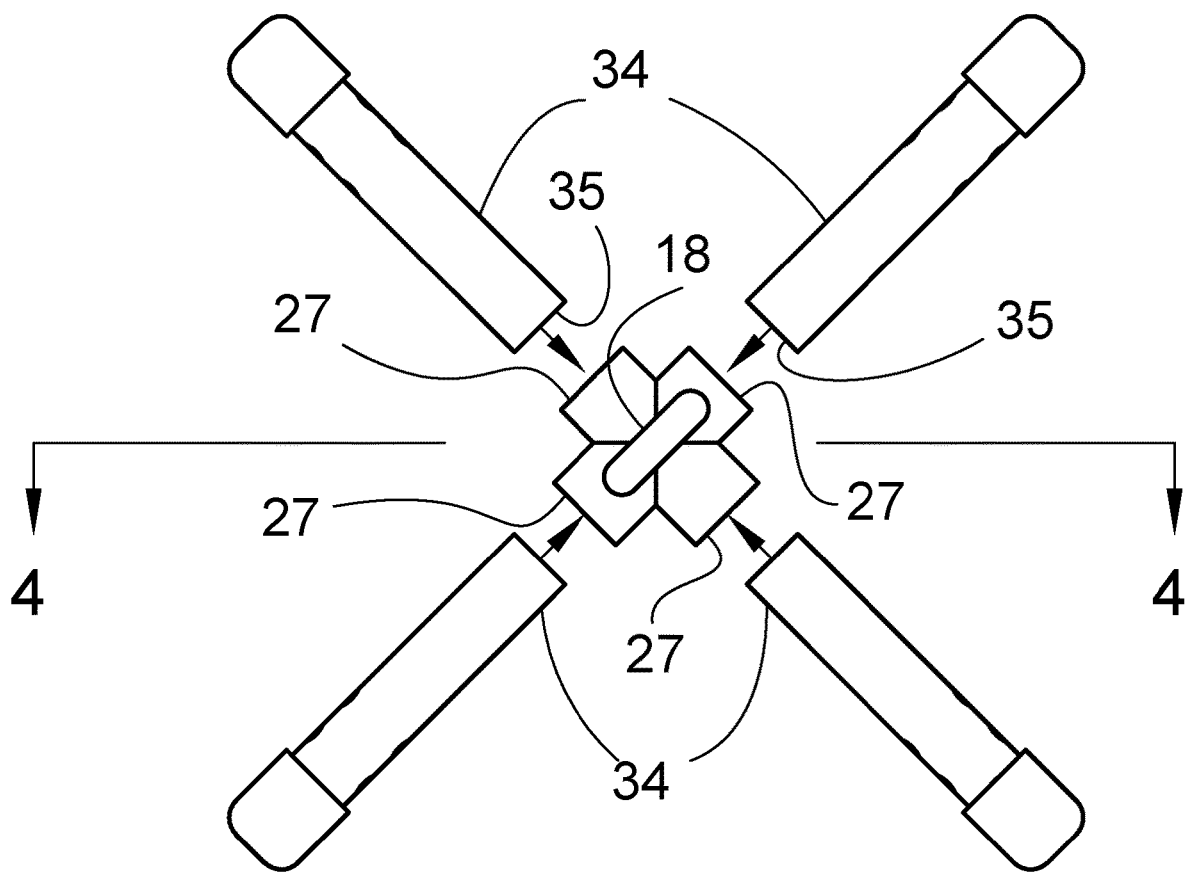
FIG. 3 is a top view of an embodiment of the disclosure.
Figure 4:
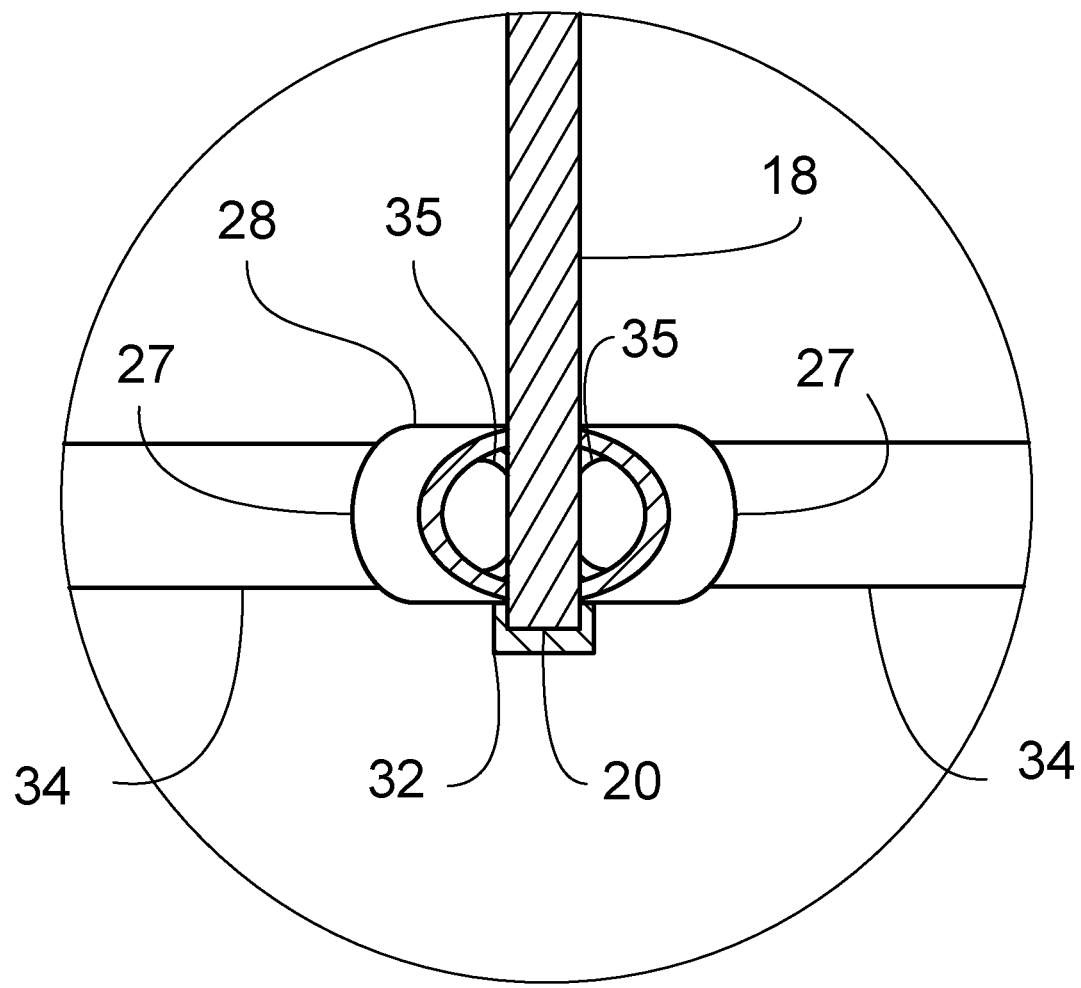
FIG. 4 is a cross sectional view taken along line 4-4 of FIG. 1 of an embodiment of the disclosure.
Figure 5:
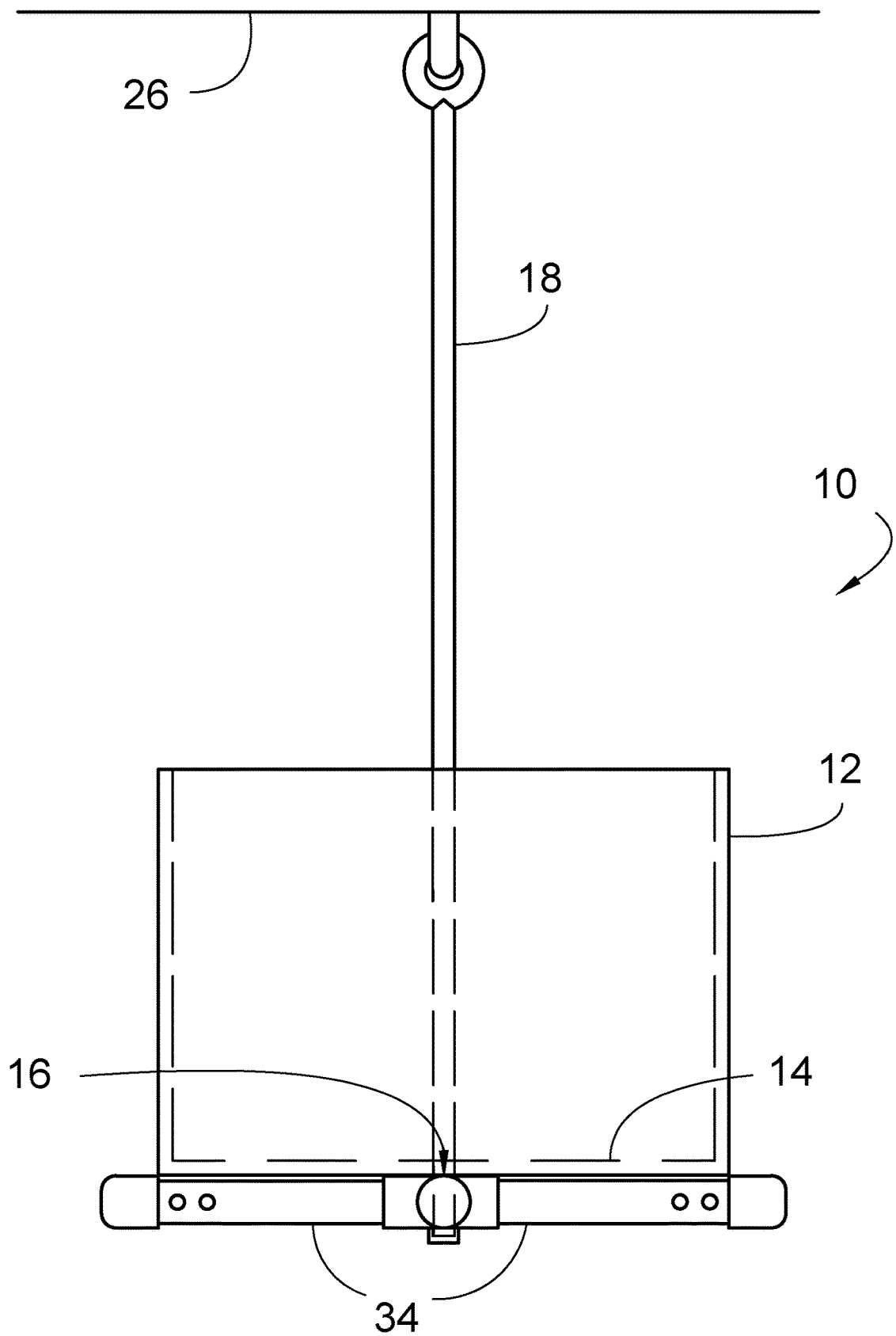
FIG. 5 is a perspective in-use view of an embodiment of the disclosure.

With reference now to the drawings, and in particular to FIGS. 1 through 5 thereof, a new hanging device embodying the principles and concepts of an embodiment of the disclosure and generally designated by the reference numeral 10 will be described.

As best illustrated in FIGS. 1 through 5, the plant hanging assembly 10 generally comprises a plant pot 12 that has a bottom wall 14 and the bottom wall 14 has a drain aperture 16 extending therethrough. The plant pot 12 may be a terra cotta plant pot and any other type or plant pot. A shaft 18 is provided and the shaft 18 is extended through the drain aperture 16 in the bottom wall 14 of the plant pot 12. The shaft 18 has a first end 20 and a second end 22, and the shaft 18 is elongated between the first end 20 and the second end 22 to a length ranging between approximately 45.0 cm and 50.0 cm. Moreover, the second end 22 is spaced downwardly from the bottom wall 14 of the plant pot 12 when the shaft 18 is extended through the drain aperture 16.

A ring 24 is coupled to the first end 20 of the shaft 18 and the ring 24 engages a support 26 such that the shaft 18 is suspended from the support 26. The support 26 may be a rafter in a roof, a ceiling and any other elevated support 26. A hub 28 is provided and the shaft 18 extends therethrough such that the hub 28 is rotatable about the shaft 18. The hub 28 has an outside surface 30. The hub has a plurality of openings 27 that each extends into an interior of the hub 28. The openings 27 are spaced apart from each other and the openings 27 are distributed around a circumference of the hub 28. A retainer 32 is removably coupled to the second end 22 of the shaft 18 and the hub 28 abuts the retainer 32. The retainer 32 has a diameter that is greater than a diameter of the hub 28 such that the retainer 32 inhibits the hub 28 from falling off of the shaft 18. The retainer 32 may be a nut that threadably engages the second end 22 of the shaft 18 or any other type of removable retainer 32.

A plurality of members 34 is each removably and rotatably coupled to the shaft 18 and each of the members 34 is oriented perpendicular with respect to the shaft 18. Each of the members 34 has a first end 35 and each of the openings 27 in the hub 28 insertably receives the first end 35 of a respective one of the members 34. The bottom wall 14 of the plant pot 12 rests on each of the members 34 when the shaft 18 is extended through the drain aperture 16. In that way the shaft 18 suspends the plant pot 12 from the support 26. Each of the members 34 extends outwardly from the outside surface 30 of the hub 28 and each of the members 34 has a distal end 36 with respect to the hub 28 and an outer wall 38. The outer wall 38 of each of the members 34 has a plurality of apertures 40 extending therethrough. A fastener, such as a string, a zip tie and any other fastener can be extended through the apertures 40 to secure additional plant pots or other objects from the members 34.

In use, the shaft 18 is extended through the drain aperture 16 in the plant pot 12 until the second end 22 is spaced from the bottom end of the plant pot 12. The hub 28 is slid onto the shaft 18 and the retainer 32 is coupled to the second end 22 of the shaft 18. The first end 35 of each of the members 34 is inserted into a respective one of the openings 27 in the hub 28. The ring 24 is suspended from the support 26 such that the plant pot 12 rests on the members 34. In this way the plant pot 12 is rotatably suspended from the support 26. Additional plant pots, soilless plants and any other objects can be suspended from the apertures 40 in the members 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant hanging assembly comprising:

a plant pot having a bottom wall, said bottom wall having a drain aperture extending therethrough;

a shaft being extended through said drain aperture in said bottom wall of said plant pot, said shaft being suspended from a support, said shaft having a first end and a second end, said shaft being elongated between said first end and said second end, said second end being spaced downwardly from said bottom wall of said plant pot when said shaft is extended through said drain aperture;

a plurality of members, each of said members being rotatably coupled to said shaft, each of said members being oriented perpendicular with respect to said shaft, said bottom wall of said plant pot resting on each of said members when said shaft is extended through said drain aperture wherein said shaft is configured to suspend the plant pot from the support; and a ring being coupled to said first end of said shaft, said ring engaging the support such that said shaft is suspended from the support.

2. A plant banging assembly comprising:

a plant pot having a bottom wall, said bottom wall having a drain aperture extending therethrough;

a shaft being extended through said drain aperture in said bottom wall of said plant pot, said shaft being suspended from a support, said shall having a first end and a second end, said shaft being elongated between said first end and said second end, said second end being spaced downwardly from said bottom wall of said plant pot when said shall is extended through said drain aperture; and a plurality of members, each of said members being rotatably coupled to said shaft, each of said members being oriented perpendicular with respect to said shaft, said bottom wall of said plant pot resting on each of said members when said shaft is extended through said drain aperture wherein said shall is configured to suspend the plant pot from the support; and a huh having said shaft extending therethrough such that said hub is rotatable about said shaft, said hub having an outside surface.

3. The assembly according to claim 2, further comprising a retainer being coupled to said second end of said shaft, said hub abutting said retainer such that said retainer inhibits said hub from falling off of said shaft.

4. The assembly according to claim 3, wherein of said members extends outwardly from said outside surface of said hub, each of said members having a distal end with respect to said hub and an outer wall.

5. The assembly according to claim 4, wherein said outer wall of each of said members having a plurality of apertures extending therethrough.

6. A plant hanging assembly comprising:

a plant pot having a bottom wall, said bottom wall having a drain aperture extending therethrough;

a shaft being extended through said drain aperture in said bottom wall of said plant pot, said shaft having a first end and a second end, said shaft being elongated between said first end and said second end, said second end being spaced downwardly from said bottom wall of said plant pot when said shaft is extended through said drain aperture;

a ring being coupled to said first end of said shaft, said ring engaging a support such that said shaft is suspended from the support;

a hub having said shaft extending therethrough such that said hub is rotatable about said shaft, said hub having an outside surface;

a retainer being coupled to said second end of said shaft, said hub abutting said retainer such that said retainer inhibits said hub from falling off of said shaft; and a plurality of members, each of said members being rotatably coupled to said shaft, each of said members being oriented perpendicular with respect to said shaft, said bottom wall of said plant pot resting on each of said members when said shaft is extended through said drain aperture wherein said shaft is configured to suspend the plant pot from the support, each of said members extending outwardly from said outside surface of said hub, each of said members having a distal end with respect to said hub and an outer wall, said outer wall of each of said members having a plurality of apertures extending therethrough.

\* \* \* \* \*